United States Patent [19]

Hooykaas

[11] Patent Number: 4,953,989

[45] Date of Patent: Sep. 4, 1990

[54] GAS BEARING PART, AND DEVICE PROVIDED WITH SUCH A GAS BEARING PART

[75] Inventor: Carel W. J. Hooykaas, Rotterdam, Netherlands

[73] Assignee: Pelt & Hooykaas B.V., Rotterdam, Netherlands

[21] Appl. No.: 302,570

[22] Filed: Jan. 26, 1989

[30] Foreign Application Priority Data

Feb. 22, 1988 [NL] Netherlands ........................ 8800440

[51] Int. Cl.[5] ............................................ F16C 32/06

[52] U.S. Cl. ...................................... 384/12; 384/121; 384/625

[58] Field of Search ................. 384/12, 121, 122, 124, 384/111, 107, 625

[56] References Cited

U.S. PATENT DOCUMENTS 3,466,103 9/1969 Davies et al. .

3,663,072 5/1972 Cvacho .

FOREIGN PATENT DOCUMENTS 0071469 2/1983 European Pat. Off. .

3513896 10/1986 Fed. Rep. of Germany .

2197422 3/1974 France .

*Primary Examiner*—Lenard A. Footland

*Attorney, Agent, or Firm*—Fiddler & Levine

[57] ABSTRACT

A gas bearing part is provided, having gas supply means which open out into a recessed working surface which can be placed opposite a carrier plate to permit formation of a gas bearing relative to the carrier plate.

To obtain a friction-free movement, also with application of higher gas pressures the roughness of the working surface is less than 10 ru, preferably less than 4 ru. The working surface is further essentially conically recessed, whereby the tip of the conical recess is essentially in the centre of the surface.

11 Claims, 2 Drawing Sheets

GAS BEARING PART, AND DEVICE PROVIDED WITH SUCH A GAS BEARING PART

BACKGROUND OF THE INVENTION

The invention relates to a gas bearing part provided with gas supply means which open out into a recessed working surface of said gas bearing part which can be placed opposite a carrier plate to permit formation of a gas bearing relative to the carrier plate.

Such a gas bearing part is generally known, and the above-mentioned recesses can be in many different forms.

Although this known gas bearing part permits friction-free movement between gas bearing part and carrier plate, while the flow of the gas is low, so that the gas bearing requires only a small quantity of gas for its functioning, it has been found that the resistance of the bearing to changing loads, i.e. the pressure which the gas bearing withstands under load without coming into contact with the carrier, calls for very high gas pressures.

However, higher gas pressures soon lead to instability of the gas bearing, which is accompanied by the occurrence of vibrations.

Of course, this is not permissible where such gas bearing parts are being used for movements requiring very great precision.

SUMMARY OF THE INVENTION

The object of the invention is then to produce a gas bearing part of the above-mentioned type which does not have these disadvantages and can be used with the application of higher gas pressures without instability of the gas bearing, and therefore without vibrations occurring.

The invention therefore relates to a gas bearing part provided with gas supply means which open out into a recessed working surface of said gas bearing part which can be placed opposite a carrier plate to permit formation of a gas bearing relative to the carrier plate, wherein the roughness of the surface is less than 10 ru.

The roughness of the surface is preferably less than 4 ru, more particularly approximately 2 ru.

The working surface of the present gas bearing part is expediently designed so that it is essentially conically recessed, the tip of the conical recess being essentially in the centre of the surface.

It has been found that by means of such a gas bearing part it is possible to construct a gas bearing which ensures good functioning, even at higher gas supply pressures. Thus it is possible, for example, at a gas supply pressure of only 4 bars and with a load of 450.N to obtain a floating height of 4.0 μm, which leads to a very stable gas bearing which works free from vibration. Even at a gas supply pressure higher than 3 bars, a stable gas bearing can be formed with the present gas bearing part, as can be seen from the measured data shown in Tables A and B below.

Compared with the known gas bearing parts, the gas bearing part according to the invention therefore provides gas bearings which ensure stable working even at higher pressures.

It is expedient if the gas supply means at least, and preferably free from burrs, open into the tip of the conical recess. In this way a gas bearing can be built up in a very stable manner. The presence of burrs probably leads to the occurrence of air eddies, which promotes the occurrence of vibrations.

The most ideal construction of the gas bearing is possible through the presence of at least one outflow aperture disposed in the centre. Several outflow apertures are, however, also possible, but they can result in interference of the outflowing gas flows and thus lead to vibrations. Such vibrations then have to be suppressed by lowering the gas supply pressure.

The depth of the conical recess is preferably 8–12 μm, more particularly approximately 10 μm. The diameter of the bearing part is in practice normally from about 6 cm to about 20 cm.

In order to avoid turbulence of the outflowing stream of gas, the aperture of the gas supply means in the essentially conically recessed surface is formed by sparking. This gives an aperture which is free from burrs, and also the correct direction of the duct.

The gas bearing part according to the invention is advantageously made of a light metal, preferably aluminium or an aluminium alloy.

Preferably, the gas bearing part is subjected to a post-treatment for improvement of the surface hardness. Such a measure will result in a gas bearing part which is not, or at least in a smaller extent, prone to damages, so that the particular shape of the present gas bearing part will be maintained. This is especially important for metals having a low surface hardness, such as aluminum. It is nevertheless remarked that such a treatment will not add an additional surface layer to the gas bearing part, but only result in a "flattening" of the surface.

The invention also relates to a gas bearing according to the invention wherein said gas bearing part is placed opposite a carrier plate for forming a gas bearing to permit a relative movement of the gas bearing part.

The invention is explained in greater detail with reference to the appended drawing.

DESCRIPTION OF THE PREFERRED EMBODIMENTS

Figure 1:
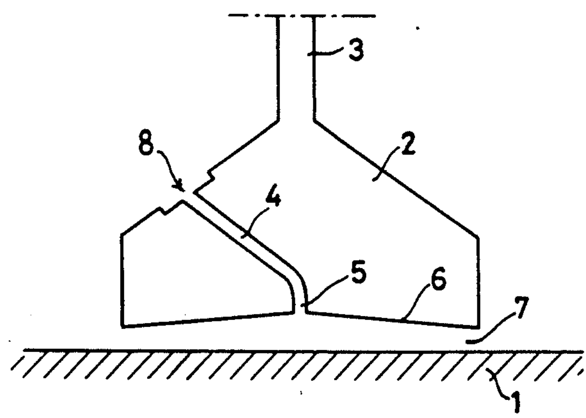
FIG. 1 is a cross-section through an air bearing having an air bearing part according to the invention.

FIG. 1 shows an air bearing, comprising an air bearing part 2 according to the invention which is opposite a carrier plate 1. Said carrier plate can be made of any suitable material, such as for example ceramic material or natural stone, in particular granite. The air bearing part 2 is provided with a set bolt 3 to permit connection of the bearing part to a part of a unit of an installation to be moved, so that a movement of the air bearing part relative to the carrier plate is made possible. The air bearing part 2 also has a duct 4 which can be connected to a source (not shown) of compressed air via air supply aperture 8.

The surface of the air bearing part 2 placed opposite the carrier plate 1 is essentially conically recessed, the tip of said conical recess being in the centre of the surface. The roughness of the conically recessed surface is less then 10 ru, preferably less than 4 ru. In the present case the roughness was 4 ru.

This air bearing part works as follows:

From gas supply aperture 8 air is fed in at a certain pressure and flows through duct 4 to the outflow aperture 5 which is in the tip of the conical recess surface 6. Aperture 5 is made in surface 6 so that it is free from burrs, by means of sparking. Such a combination of measures is found in practice to provide the possibility of forming an air bearing which is very stable even at higher gas supply pressures.

Figure 2:
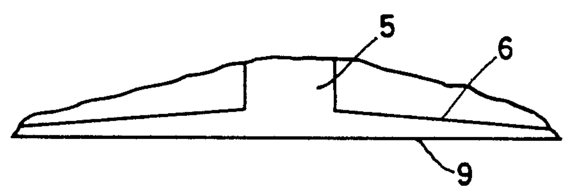
FIG. 2 shows in greatly enlarged form the central part of the conical surface of an air bearing part according to the invention.

FIG. 2 shows a central part of the conically recessed surface of the air bearing part according to FIG. 1, in greatly enlarged form. In reality, the distance between the outflow aperture 5 in the tip of the conical recess and the face 9 formed by the periphery is only 8–12 μm, and preferably about 10 μm.

Tables A and B below give some parameters which are obtained with a particular gas supply pressure and load using a gas bearing part according to the invention with a diameter of 60 mm, the roughness of the working surface being 4 ru.

TABLE A

| Supply pressure (bars) | Load (N) | Floating height (μm) | Air (ltr/min) | Behaviour | Comment |
|---|---|---|---|---|---|
| 3 | 150 | 7.7 | 0.0 | stable | |
| | 300 | 4.1 | 0.0 | stable | |
| | 450 | 2.0 | 0.0 | stable | mech.contact |
| | 600 | — | 0.0 | | mech.contact |
| | 750 | — | 0.0 | | mech.contact |
| | 900 | — | 0.0 | | mech.contact |
| | 1050 | — | 0.0 | | mech.contact |
| 4 | 150 | 10.0 | 0.0 | stable | |
| | 300 | 6.0 | 0.0 | stable | |
| | 450 | 4.0 | 0.0 | stable | |
| | 600 | 2.4 | 0.0 | stable | critical height |
| | 750 | 1.7 | 0.0 | stable | mech.contact |
| | 900 | — | 0.0 | | mech.contact |
| | 1050 | — | 0.0 | | mech.contact |
| 5 | 150 | 10.9 | 0.0 | stable | |
| | 300 | 7.1 | 0.0 | stable | |
| | 450 | 5.2 | 0.0 | stable | |
| | 600 | 3.8 | 0.0 | stable | critical height |
| | 750 | 2.7 | 0.0 | stable | critical height |
| | 900 | 1.9 | 0.0 | stable | mech.contact |
| | 1050 | — | 0.0 | | mech.contact |
| 6 | 150 | 11.8 | 0.0 | stable | |
| | 300 | 8.0 | 0.0 | unstable | |
| | 450 | 6.0 | 0.0 | unstable | |
| | 600 | 4.7 | 0.0 | stable | |
| | 750 | 3.8 | 0.0 | stable | critical height |
| | 900 | 3.0 | 0.0 | stable | critical height |
| | 1050 | 2.3 | 0.0 | stable | critical height |

Figure 3:
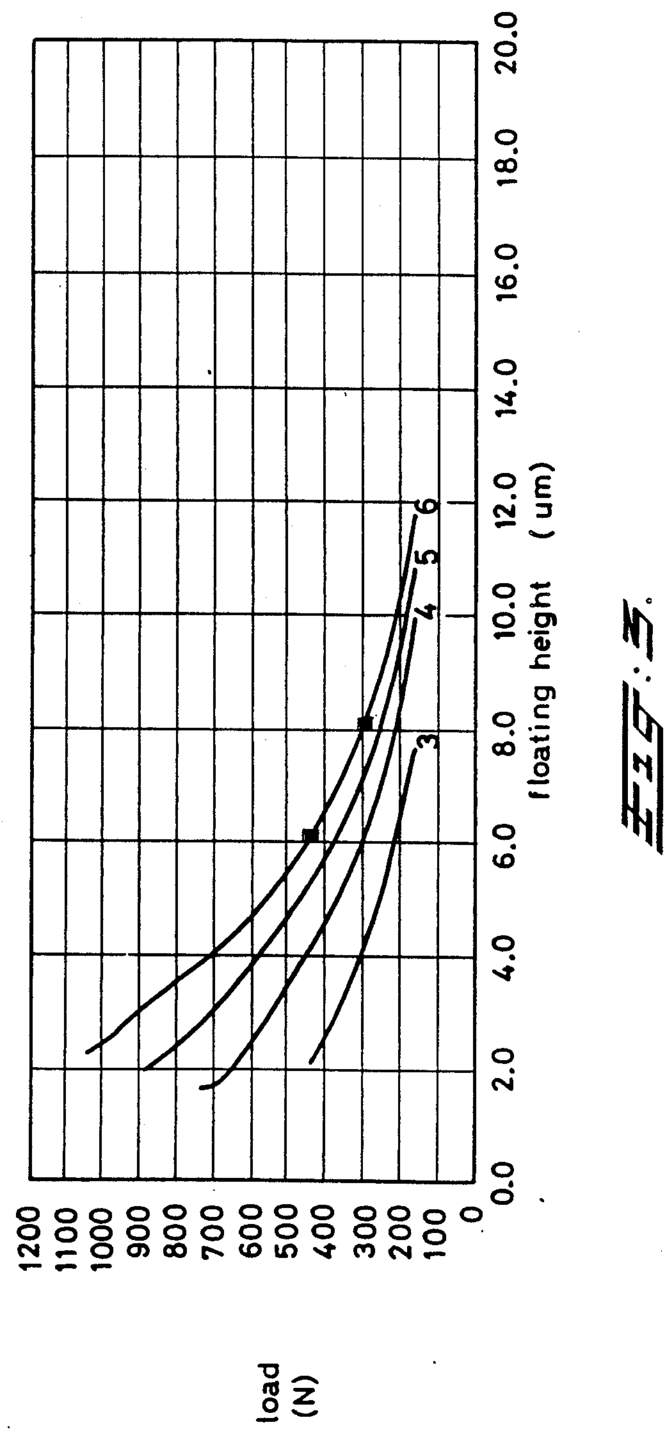

The bearing power characteristic obtained on the basis of the above measurements is given in FIG. 3, the floating height being indicated in μm on the abscissa, and the load in N on the ordinate.

TABLE B

| Supply pressure (bars) | Load (N) | Floating height (μm) | Stiffness (N/μm) |
|---|---|---|---|
| 3 | 150 | 7.7 | 35.2 |
| | 186 | 6.7 | 36.8 |
| | 204 | 6.2 | 38.5 |
| | 222 | 5.8 | 40.3 |
| | 240 | 5.4 | 42.4 |
| | 258 | 5.0 | 44.6 |
| | 276 | 4.6 | 47.2 |
| | 294 | 4.2 | 50.0 |
| | 312 | 3.9 | 53.2 |
| 4 | 150 | 10.0 | 26.1 |
| | 186 | 8.7 | 29.2 |
| | 204 | 8.1 | 32.6 |
| | 222 | 7.6 | 36.3 |
| | 240 | 7.2 | 40.4 |

TABLE B-continued

| Supply pressure (bars) | Load (N) | Floating height (μm) | Stiffness (N/μm) |
|---|---|---|---|
| | 258 | 6.8 | 44.8 |
| | 312 | 5.8 | 59.4 |
| | 384 | 4.8 | 77.5 |
| | 456 | 3.9 | 87.6 |
| 5 | 150 | 10.9 | 27.7 |
| | 186 | 9.7 | 30.9 |
| | 204 | 9.1 | 34.4 |
| | 222 | 8.7 | 38.3 |
| | 258 | 7.9 | 46.9 |
| | 312 | 6.9 | 61.6 |
| | 384 | 5.9 | 81.2 |
| | 474 | 5.0 | 99.2 |
| | 582 | 4.0 | 114.5 |
| 6 | 150 | 11.8 | 28.2 |
| | 186 | 10.6 | 31.4 |
| | 222 | 9.6 | 38.5 |
| | 258 | 8.8 | 46.3 |
| | 312 | 7.8 | 59.0 |
| | 366 | 7.0 | 72.0 |
| | 456 | 5.9 | 94.2 |
| | 564 | 5.0 | 125.8 |
| | 726 | 3.9 | 181.8 |

The average absolute stiffness of an air bearing obtained using an air bearing part according to the invention is therefore:

at 3 bars: 43.1 N/μm at 4 bars: 60.6 N/μm at 5 bars: 79.0 N/μm at 6 bars: 106.2 N/μm.

The above values show without further ado the particularly advantageous behavior of an air bearing part according to the invention.

What is claimed is:

1. Gas bearing part provided with gas supply means which open out into a recessed working surface of said gas bearing part which can be placed opposite a carrier plate to permit formation of a gas bearing relative to the carrier plate, wherein said gas bearing part is a completely solid body having a working surface defined by an essentially conical recess, the top of the conical recess being essentially in the center of the surface, the gas supply means opening out substantially and exclusively into the top of the conical recess and wherein the roughness of the working surface is less than 10 ru.

2. Gas bearing part according to claim 1, wherein the roughness of the working surface is less than 4 ru.

3. Gas bearing part according to claim 1, wherein the roughness of the working surface is approximately 2 ru.

4. Gas bearing part according to claim 1, wherein said gas bearing part is placed opposite a carrier plate for forming a gas bearing to permit relative movement of the gas bearing part.

5. Gas bearing part according to claim 1, wherein the gas supply means open out free from burrs, into the top of the conical recess.

6. Gas bearing part according to claim 1, wherein the depth of the conical recess is 8–12 $\mu$m.

7. Gas bearing part according to claim 6, wherein the depth of the conical recess is approximately 10 $\mu$m.

8. Gas bearing part according to claim 1, wherein the outflow aperture of the gas supply means is formed by sparking.

9. Gas bearing part according to claim 1, wherein the gas bearing part is made of a light metal.

10. Gas bearing part according to claim 9, wherein the metal is chosen from the group consisting of aluminum or an aluminum alloy.

11. Gas bearing part according to claim 1, wherein said gas bearing part is subjected to a post-treatment for improvement of the surface hardness.

* * * * *